United States Patent Office 2,728,554
Patented Dec. 27, 1955

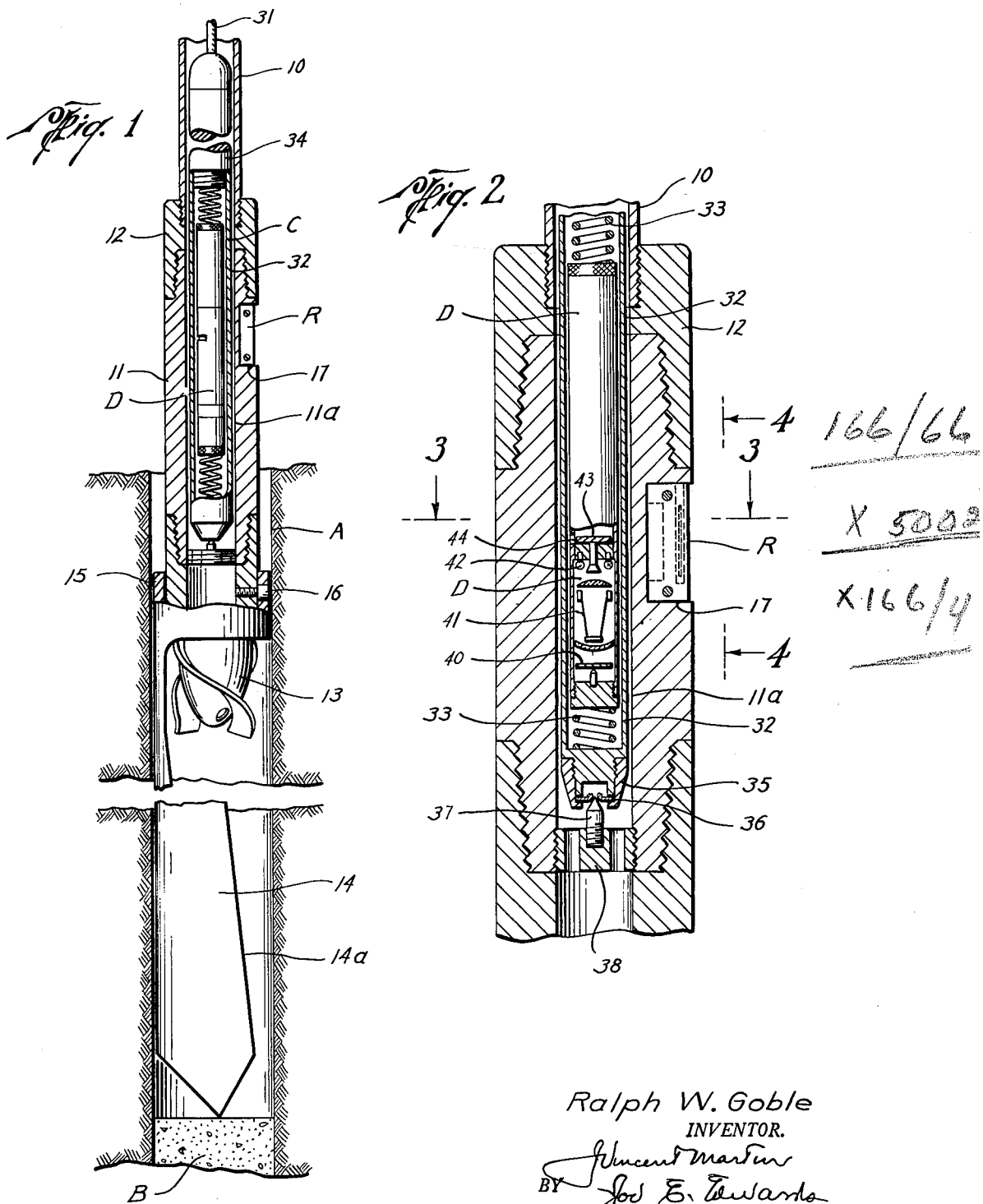

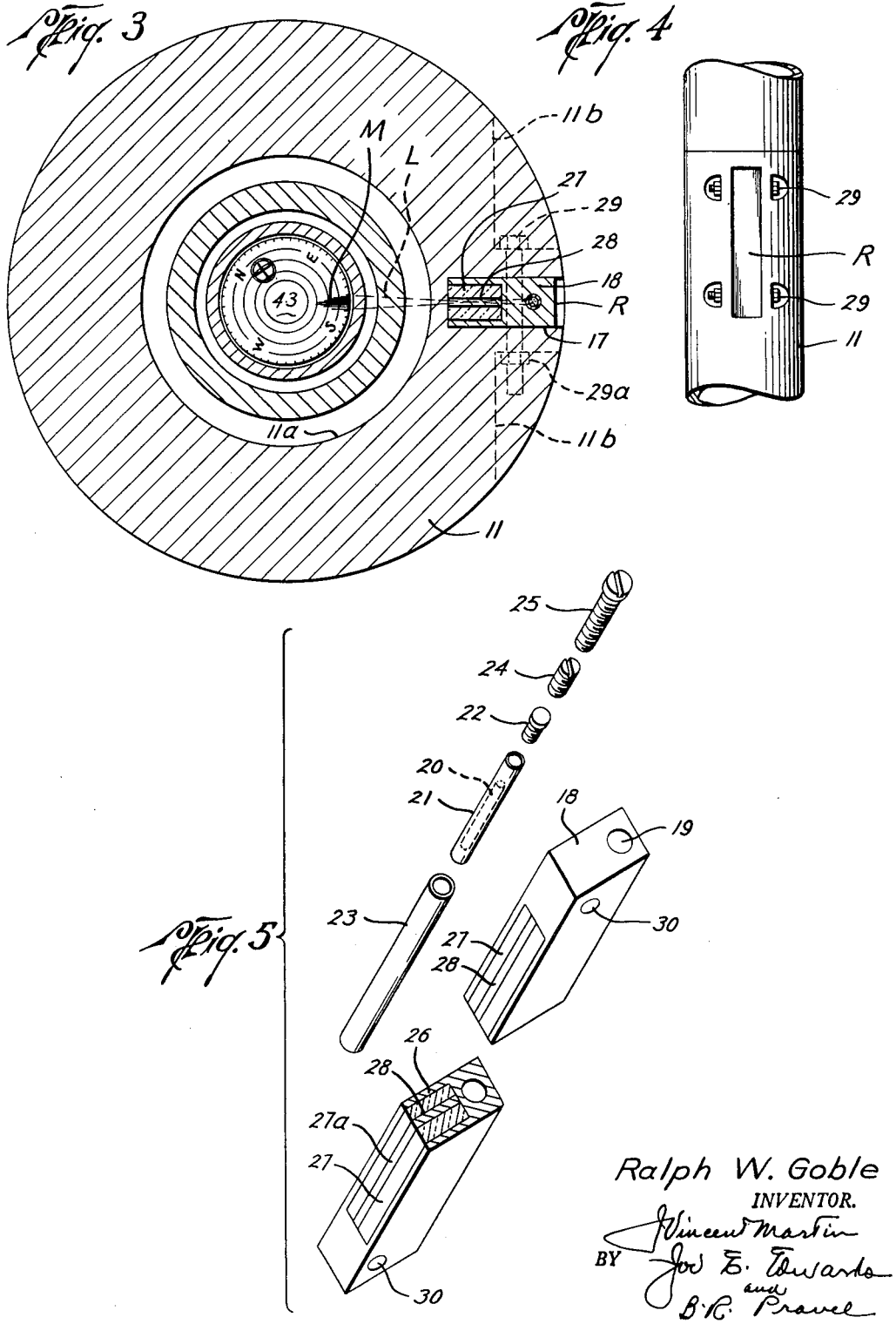

2,728,554

MEANS FOR ORIENTING TOOLS IN WELL BORES

Ralph W. Goble, Denver, Colo., assignor to Eastman Oil Well Survey Company, Denver, Colo., a corporation of Delaware Application August 4, 1952, Serial No. 302,592

10 Claims. (Cl. 255—1.6)

This invention relates to new and useful improvements in means for orienting tools in well bores.

In directional drilling and side tracking operations, it is necessary that deflecting tools, such as whipstocks, knuckle joints and other devices, be oriented within the well bore so that the actual drilling may be carried out in a desired direction. There are several methods of properly orienting tools within well bores, and one of such methods is disclosed in the prior patent issued to L. C. Miller, No. 2,327,658, dated August 24, 1943. The method and apparatus disclosed in such prior patent involves the use of a magnetic element which is mounted in the drill pipe in a known relation to the tool to be oriented, together with a recording instrument which is adapted to be lowered opposite and influenced by the magnetic element in the drill pipe. The record, carried by a magnetic carrier, is made with the record disc in a predetermined position with respect to the magnet and after the record is so obtained, it may by means of a reading device at the surface be interpreted to give the required information.

As is clearly set forth in the aforesaid Miller patent, this method of orientation requires a reader at the surface which will cause the magnetic carrier within which the record disc is mounted to assume the same position within the reader that it had at the time that the record was made whereby proper interpretation thereof may be made.

It is one object of the present invention to provide an improved apparatus for orienting well tools wherein the position of the tool with respect to azimuth is recorded upon a record whereby visual examination of such record provides the operator with the desired information and also whereby the use of magnetic elements in the drill stem or a special reader, such as are necessary in the aforesaid Miller patent, are not required.

An important object of the invention is to provide an improved apparatus for orienting tools, wherein a radioactive isotope is employed for the purpose of marking a record to indicate the tool position, whereby the making of the record is automatically accomplished upon the positioning of the record adjacent the radioactive isotope element.

A further object is to provide an improved tool within a well bore wherein the tool is secured to the lower end of a drill pipe in a known relationship and is lowered into the bore, after which a recording instrument is lowered through the pipe to record azimuthal position or compass direction with respect to the position of the tool, whereby the record provides accurate information as to azimuthal position of the tool within the well bore.

A particular object is to provide an improved well tool orienting apparatus which includes a radioactive isotope element which is mounted within the drill pipe in a known relation to the tool and wherein the record is a film arranged to be lowered to a position adjacent the radioactive isotope element so that the emitted radiation from said radioactive isotope form a mark or indication upon said film; the arrangement providing for immediate and accurate marking of the film upon said film assuming its position adjacent said radioactive isotope element.

A still further object is to provide an improved apparatus wherein a radioactive isotope, such as Cobalt 60, Selenium 75, Cesium 134, is employed as a film marking medium, together with improved means for mounting the radioactive isotope in a manner to confine and direct the gamma radiation to produce a substantially radial mark or indication on a record film.

Other objects will appear hereinafter.

The construction designed to carry out the invention will be hereinafter described together with other features of the invention.

The invention will be more readily understood from a reading of the following specification and by reference to the accompanying drawings, wherein an example of the invention is shown, and wherein:

Figure 1 is a view partly in section and partly in elevation illustrating a drill pipe having a whipstock secured thereto and showing the improved orienting apparatus constructed in accordance with the invention in position within the drill pipe, Figure 2 is an enlarged transverse sectional view of the orienting apparatus and its coacting sub which is connected to the lower end of the drill pipe, Figure 3 is an enlarged transverse sectional view taken on the line 3—3 of Figure 2, Figure 4 is an elevation of the sub in which the radioactive isotope element is mounted, and Figure 5 is an exploded view of the holder and collimator within which the radioactive isotope element is mounted.

In the drawings, the numeral 10 designates the usual drill pipe or stem which has an elongate cylindrical sub 11, preferably constructed of a non-magnetic material connected to its lower end by a suitable coupling 12. A drill bit 13 is secured to the lower end of the sub 11 by means of screw threads and said bit may be of any suitable type, a drag bit being illustrated. With this arrangement, it will be obvious that the sub 11 is interposed between the lower end of the drill stem or pipe 10 and the bit 13.

A whipstock 14, or other tool to be oriented is provided with a collar 15 which is made integral with its upper end. This collar surrounds the drill bit 13 and is secured thereto by means of a shear pin 16. It is noted that the shear pin is preferably located in the same vertical plane as the angular face 14a of the whipstock and it will be apparent that when the drill pipe is lowered through the well bore A the whipstock as well as the bit are lowered therewith. A rotation of the drill pipe will impart a rotation to the whipstock so that said whipstock may be oriented in the hole to locate its inclined guide face 14a in a desired direction. When the whipstock engaged with the lower end of the drill bore or a cement plug B therein, the weight of the drill pipe 10 may be imposed upon the shear pin 16 to fracture said pin and disconnect the bit 13 from the whipstock collar, whereby the bit, sub 11 and drill pipe may move downwardly through said collar. Subsequent rotation of the pipe and drill bit 13 results in the bit being guided along the angular face 14a of the whipstock so that said bit drills outwardly in a direction in accordance with the setting of the whipstock.

As has been stated, the sub 11 is preferably constructed of a non-magnetic material and mounted in a recess or opening 17 formed in the wall of the sub is a radioactive isotope assembly generally indicated by the letter R. As illustrated in the drawing, the shear pin 16 which secures the whipstock to the drill bit is located in the same vertical plane as the assembly R. In making up the threaded connection between the drill bit and the sub 11, the shear pin 16 may become misaligned in a vertical plane with the assembly R, and in such instance the number of degrees of such misalignment is recorded whereby the operator may know at all times the relative position of the shear pin with respect to the radioactive isotope assembly R. The shear pin is in a known relationship to the angular guide face 14a of the whipstock, and thus the radioactive isotope assembly R becomes representative of the position of the whipstock face 14a. It is noted that if desired the whipstock collar 15 could be secured directly to the sub 11 rather than to the bit, and in such case the opening which receives the shear pin would always be aligned with the assembly R.

The radioactive isotope assembly is illustrated in Figure 5 and includes a source holder or block 18 which is insertable within the slot 17 in the sub 11 (Figure 3). The holder or block is generally rectangular in cross-section and is somewhat elongate; a longitudinal bore 19 is formed within the block, and this bore is adapted to receive the radioactive isotope element. The radioactive isotope element 20 is preferably Cobalt 60, which has been found to be satisfactory, but the invention is not to be limited to this particular radioactive isotope since Selenium 75 or Cesium 134 or other radioactive isotope might be employed. The particular Cobalt 60 element is preferably in wire form and is enclosed within a source tube 21. One end of the tube 21 is closed with the opposite end receiving a sealing cap 22. The source tube having the element 20 therein is placed within a secondary tube 23 which has one end closed and has its opposite end adapted to be closed after tube 21 is inserted by a sealing screw 24. The secondary tube 23 is then inserted into the bore 19 of the block or holder 18, and said bore is then closed by a threaded cap member 25. With this arrangement the radioactive isotope element 20 is mounted within the block 18 and extends longitudinally thereof at one side of the block, as is clearly evident from Figures 2 and 3.

The block is preferably constructed of brass, and at the side opposite the bore 19 said holder is formed with an elongate slot 26. The sides of the slot are lined with lead plates 27 which function as shields and interposed between the plates and separating the same is a transparent or other non-shielding plate 27a which is preferably constructed of Plexiglas. The area between the lead plates 27, within which the plate 27a is located, forms a relatively narrow slot 28 which is in substantial alignment in a transverse plane with the bore 19, and thus the gamma radiation from the isotope element or source 20 is directed outwardly through this narrow slot. The plate 27a being of a non-shielding material does not impede or otherwise interfere with this radiation.

The block 18 is inserted within the slot 17 of the sub 11 in the manner shown in Figure 3, with the narrow slot 28 between the lead plates 27 being located in a radial plane with respect to the sub and being directed inwardly toward the bore 11a of said sub. The block 18 is held in position within the slot 18 of the sub by means of bolts 29 which extend through openings 30 formed in the block and which receive nuts 29a on their outer ends. The external surface of the sub 11 is milled out or recessed as indicated at 11b to receive the bolts 29 and nuts 29a.

The particular mounting of the radioactive isotope element 20 within the bore 19 of the block, together with the lead plate arrangement, results in the radiation from the element 20 being substantially confined between the lead plates 27 and directed outwardly through the slot 28. Thus, the radiation is confined to a relatively narrow path, which path is in a substantially radial direction inwardly of the bore 11a of the sub.

After the whipstock has been connected to the bit and the sub having the radioactive isotope assembly R mounted therein has been connected with the drill pipe and bit, the apparatus is lowered into the well bore A until the whipstock reaches the position at which it is to be set.

Following the positioning of the whipstock a recording instrument assembly C is adapted to be lowered by means of a wire line or cable 31 downwardly through the drill stem 10 and into the bore 11a of the sub. The assembly C includes a well survey instrument D which will be hereinafter described and which instrument is mounted within an outer barrel 32 (Figure 2). Shock absorbing springs 33 are disposed between the upper and lower ends of the instrument D and the ends of the protective barrel 32 and function to protect the instrument against undue shock during its movement through the drill pipe. The upper end of the protective barrel is connected with a suitable sinker or weight bar 34 which is, in turn, connected with the lowering line 31. The lower end of the protective barrel has a collar 35 threaded thereon, and this collar confines a soft lead disc 36 which is adapted to engage a pointed marking pin 37 which extends upwardly from a spider member 38 threaded into the bore 11a of the sub. The marking pin 37 provides a means which will indicate that the recording instrument assembly C reached its proper position within the sub.

The well survey instrument D is illustrated as the usual type of well survey instrument known as a single shot instrument. The instrument includes a magnetic compass 40 and a plumb bob 41 which is disposed above said compass. As is well known, the compass will indicate magnetic north, while the plumb bob will fall toward the low side of the hole to indicate the position of such low side of the hole. The instrument includes a camera section having lamps 42, and a film disc 43 is insertable through a slot 44 in the instrument. The particular specific details of the instrument are not illustrated since said instrument is well known in the art. It is sufficient to say that a suitable timing mechanism controls the illumination of the lights 42 whereby an image of the positions of the compass and plumb bob will be photographed on the film 43.

When the assembly C is in position with the sub 11 the film disc 43 will be disposed opposite the radioactive isotope assembly R and the radiations passing through the slot 28 in the block 18 will be directed against the edge of the film. As explained, the slot 28 in the block 18 confines the radiations to a relatively narrow path and upon leaving the slot the radiations are spread slightly as illustrated by the dotted lines L in Figure 3. The gamma radiation striking the film disc will result in marking that portion of the film exposed to said radiation; as the rays strike the peripheral edge of the disc, they are interrupted to some extent and the exposure of the film in the manner described results in the disc being marked with a mark M of substantially the shape illustrated in Figure 3. When the instrument D is operated, the positions of the compass and plumb bob are photographed on the disc, and thus the film disc, upon subsequent developments, includes the indications of the compass and plumb bob, as well as the mark M.

As has been explained, the radioactive isotope assembly R is in a known position with respect to the face of the whipstock and is representative of such whipstock face; therefore, the radial position of the mark M with respect to the compass photograph will give the compass position of the whipstock face while the relationship between the compass direction and the position of the plumb bob image will indicate the direction in which the well bore is inclining. It is, therefore, evident that the radioactive isotope assembly will imprint or mark the film disc 43 with the particular position of the face of the tool.

The operation of the apparatus is believed obvious from the foregoing. The radioactive isotope element 20 properly assembled, as illustrated in Figure 5, is mounted within the block 18 and said block is placed within the sub 11, being in a known position with respect to the particular tool to be oriented. The whipstock assembly and drill stem are then lowered into position within the drill bore and when a record is to be made the instrument assembly C is lowered through the drill pipe on the wire line. When the assembly C reaches its final position the film disc 43 of the well survey instrument D is adjacent the narrow slot 28 through which the gamma radiations emanate, and such radiations result in the production of the mark M on the film disc. In actual practice it has been found that the mark M will be produced on the film by an exposure of from 1½ to 8 minutes. The timing mechanism of the instrument D is then operated to photograph the compass and plumb bob positions, it being noted that the compass may register magnetic north because the sub 11 is constructed of non-magnetic material. The instrument is then removed and the film is developed to reproduce the image of the compass and plumb bob so that the final film will provide the compass indication, the mark M which represents the position of the tool to be oriented, and the plumb bob position. It is evident that from this record the actual position of the whipstock can be accurately determined and thereafter a rotation of the drill stem will rotate the whipstock into a desired position for the subsequent drilling operation.

The particular instrument D which is illustrated is a single shot type of instrument having both a magnetic compass and a plumb bob; however, other types of instruments may be employed. For example, if the operator knows, by reason of an earlier survey, the direction of inclination of the well bore, the instrument D need only contain the plumb bob which indicates the low side of the hole. In such case, the plumb bob becomes an azimuth indicating means and the angular position of the plumb bob with respect to the mark M would give the operator the position of the tool. It is also apparent that compass position of the tool can be determined if the instrument D contains only the compass so that in some instances the plumb bob need not be employed. An instrument having both compass and plumb bob has been shown and described and is merely illustrative since this type of instrument is now in general use in well surveying operations.

As has been noted, any suitable radioactive isotope capable of emitting gamma radiation and having the ability to penetrate the metal of the sub 11 to mark the film is satisfactory for the present method. Cobalt 60 has been found suitable for the purpose, but the invention is not to be limited to this specific material. It is, of course, evident that when the radioactive isotope is not in use it is removed from the block 18 and placed in the usual well known shield. One of the features of the invention resides in the manner of confining the emanations or radiation to a relatively narrow path to assure that a distinct mark M which is representative of tool position is produced on the film. Although the particular construction of the block has been found suitable, it is apparent that this structure may be modified to some extent, and so long as the radiations are directed in a relatively narrow path radially of the film the results of the invention will be accomplished.

Having described the invention, I claim:

1. An apparatus for determining the azimuthal position of a tool within a well bore including, a hollow drill stem, a tool attached to said drill stem, a radioactive isotope element mounted in the drill stem in a known radial position with respect to the tool, and an instrument adapted to be lowered within the drill stem to occupy a predetermined final position therein and containing a record film, means for indicating azimuth and means for recording the position of the azimuth indicating means on said record film, said film being disposed adjacent the radioactive isotope element when the instrument is in its final position, whereby that portion of the record film exposed to the radiations emanating from the radioactive isotope element is marked to provide an indication of the position of the radioactive isotope element with respect to azimuth to thereby provide an indication of the position of the tool connected with the drill stem relative to the azimuth indicating means of said instrument.

2. An apparatus as set forth in claim 1, together with means associated with the radioactive isotope element for confining the radiations of said element to a narrow path extending in a radial plane with respect to the drill stem.

3. An apparatus for determining the azimuthal position of a tool within a well bore including, a hollow drill stem, a tool attached to said drill stem, a radioactive isotope element mounted in the drill stem in a known radial position with respect to the tool, and an instrument adapted to be lowered within the drill stem to occupy a predetermined final position therein, said instrument having therein a magnetic compass, a record film and means for photographing the compass upon said film, said film being disposed adjacent the radioactive isotope element when the instrument is in its final position, whereby that portion of the record film exposed to the radiations emanating from the radioactive isotope element is marked to give an indication of the radial position of said element, determination of the position of the marked area of the film with respect to compass direction providing information as to the position of the tool.

4. An apparatus as set forth in claim 3, together with means associated with the radioactive isotope element for confining the radiations of said element to a narrow path extending in a radial plane with respect to the drill stem.

5. An apparatus for determining the azimuthal position of a tool within a well bore including, a hollow drill stem, a tool attached to said drill stem, a radioactive isotope element mounted in the drill stem in a known radial position with respect to the tool, and an instrument adapted to be lowered within the drill stem to occupy a predetermined final position therein, said instrument having therein a plumb bob, a record film, and means for photographing the position of the plumb bob upon the record film, said film being disposed adjacent the radioactive isotope element when the instrument is in its final position, whereby that portion of the record film exposed to the radiations emanating from the radioactive isotope element is marked to give an indication of the radial position of the element and therefore of the tool relative to the indication of the plumb bob within the instrument, whereby the position of the tool relative to azimuth may be ascertained.

6. An apparatus as set forth in claim 5, together with means associated with the radioactive isotope element for confining the radiations of said element to a narrow path extending in a radial plane with respect to the drill stem.

7. An apparatus for determining the azimuthal position of a tool within a well bore including, a hollow drill stem, a tool attached to said drill stem, a radioactive isotope element mounted in the drill stem in a known radial position with respect to the tool, and an instrument adapted to be lowered within the drill stem to occupy a predetermined final position therein, said instrument containing a magnetic compass, a plumb bob, a record film, and means for photographing the positions of the magnetic compass and the plumb bob on said film, the record film being disposed adjacent the radioactive isotope element when the instrument is in its final position, whereby that portion of the record film exposed to the radiations emanating from the radioactive isotope element is marked to give an indication of the position of the drill stem relative to the instrument.

8. An apparatus for determining the azimuthal position of a tool within a well bore including, a hollow drill stem, a tool attached to said drill stem, said stem having a recess in its wall disposed in a radial plane with respect to the stem and in a known angular relationship to the tool, a block insertable and secured within the recess and having a bore which is parallel to the axis of the drill stem, a radioactive isotope element mounted in the bore of said block, said block having a radial relatively narrow slot in longitudinal alignment with the bore of the block, shielding means lining said slot to confine the radiations emanating from the radioactive isotope element in a narrow path radially of the drill stem, and an instrument adapted to be lowered within the drill stem to occupy a predetermined final position therein and containing a record film, means for indicating azimuth and means for recording the position of the azimuth indicating means on said record film, said film being disposed adjacent the narrow slot of the block when the instrument is in its final position, whereby that portion of the record film exposed to the radiations emanating from the radioactive isotope element is marked to give an indication of the position of the drill stem relative to the instrument.

9. An apparatus for determining the azimuthal position of a tool within a well bore including, a hollow drill stem, a tool attached to said drill stem, said stem having a recess in its wall disposed in a radial plane with respect to the stem and in a known angular relationship to the tool, a block insertable and secured within the recess and having a bore which is parallel to the axis of the drill stem, a radioactive isotope element mounted in the bore of said block, said block having a radial relatively narrow slot in longitudinal alignment with the bore of the block, shielding means lining said slot to confine the radiations emanating from the radioactive isotope element in a narrow path radially of the drill stem, and an instrument adapted to be lowered within the drill stem to occupy a predetermined final position therein, said instrument containing a magnetic compass, a record film and means for photographing the compass upon said film, the record film being disposed adjacent the narrow slot of said block when the instrument is in its final position, whereby that portion of the record film exposed to the radiations emanating from the radioactive isotope element is marked to provide an indication of the position of the drill stem relative to the instrument.

10. An apparatus for determining the azimuthal position of a tool within a well bore including, a hollow drill stem, a tool attached to said drill stem, said stem having a recess in its wall disposed in a radial plane with respect to the stem and in a known angular relationship to the tool, a block insertable and secured within the recess and having a bore which is parallel to the axis of the drill stem, a radioactive isotope element mounted in the bore of said block, said block having a radial relatively narrow slot in longitudinal alignment with the bore of the block, shielding means lining said slot to confine the radiations emanating from the radioactive isotope element in a narrow path radially of the drill stem, and an instrument adapted to be lowered within the drill stem to occupy a predetermined final position therein, said instrument containing a magnetic compass, a plumb bob, a record film, and means for photographing the positions of the plumb bob and compass upon said film, said film being disposed adjacent the narrow slot of the block when the instrument is in its final position, whereby a mark is formed on the record film by the radiations which emanate from the radioactive isotope element to provide an indication of the position of the drill stem relative to the instrument.

References Cited in the file of this patent

UNITED STATES PATENTS

| | | |
|---|---|---|
| Re. 22,531 | Hare | Aug. 22, 1944 |
| 1,617,397 | Knipp | Feb. 15, 1927 |
| 2,327,658 | Miller | Aug. 24, 1943 |
| 2,399,061 | Rosenblum | Apr. 23, 1946 |
| 2,479,882 | Wallhausen et al. | Aug. 23, 1949 |
| 2,488,269 | Clapp | Nov. 15, 1949 |
| 2,546,984 | Deloraine et al. | Apr. 3, 1951 |